(12) United States Patent
Hsieh et al.

(10) Patent No.: US 7,570,009 B2
(45) Date of Patent: Aug. 4, 2009

(54) FAN SYSTEM AND ITS CONTROL DEVICE AND CONTROL METHOD

(75) Inventors: Tsung-Jung Hsieh, Taoyuan Hsien (TW); Ming-Lung Liu, Taoyuan Hsien (TW); Ming-Yen Lin, Taoyuan Hsien (TW); Wen-Ping Teng, Taoyuan Hsien (TW); Yueh-Lung Huang, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 400 days.

(21) Appl. No.: 11/504,719

(22) Filed: Aug. 16, 2006

(65) Prior Publication Data

US 2007/0041824 A1    Feb. 22, 2007

(30) Foreign Application Priority Data

Aug. 19, 2005  (TW) ............................. 94128343 A
Jan. 3, 2006   (TW) ............................. 95100198 A

(51) Int. Cl.
*H02P 1/26* (2006.01)

(52) U.S. Cl. ................. 318/779; 318/461; 318/778; 361/687; 361/695

(58) Field of Classification Search ................. 318/461, 318/471–473, 720–724, 778–779; 361/687, 361/695

See application file for complete search history.

(56) References Cited

U.S. PATENT DOCUMENTS

| 6,040,668 | A  | * | 3/2000  | Huynh et al. ............... 318/471 |
| 6,135,718 | A  | * | 10/2000 | Yang ......................... 417/22 |
| 6,380,704 | B1 | * | 4/2002  | Chin ........................ 318/268 |
| 6,396,231 | B1 | * | 5/2002  | Horng et al. ............... 318/471 |
| 6,810,202 | B2 | * | 10/2004 | Hsu et al. ................... 388/800 |
| 7,205,733 | B2 | * | 4/2007  | Xiong et al. ............ 318/400.11 |
| 7,245,099 | B2 | * | 7/2007  | Yamamoto et al. ......... 318/471 |

\* cited by examiner

*Primary Examiner*—Bentsu Ro
*Assistant Examiner*—Thai Dinh
(74) *Attorney, Agent, or Firm*—Birch, Stewart, Kolasch & Birch, LLP

(57) ABSTRACT

A control device of a fan system, which has at least one fan, receives a starting voltage. The control device includes a start controlling unit and a driving unit. The start controlling unit receives the starting voltage and outputs a start controlling signal according to the starting voltage. After a predetermined period, the start controlling unit stops sending the start controlling signal. The driving unit is electrically connected to the start controlling unit and the fan, respectively. The driving unit receives the start controlling signal for controlling the rotation speed of the fan.

22 Claims, 5 Drawing Sheets

FAN SYSTEM AND ITS CONTROL DEVICE AND CONTROL METHOD

CROSS REFERENCE TO RELATED APPLICATIONS

This Non-provisional application claims priority under 35 U.S.C. §119(a) on Patent Application Nos. 094128343 filed in Taiwan, Republic of China on Aug. 19, 2005, and 095100198 filed in Taiwan, Republic of China on Jan. 3, 2006, the entire contents of which are hereby incorporated by reference.

BACKGROUND OF THE INVENTION

1. Field of Invention

The invention relates to a fan system, a control device of a fan system and a control method of a fan system. In particular, the invention relates to a fan system, a control device of a fan system and a control method of a fan system, which can start a fan in a lower rotation speed.

2. Related Art

In general, electronic systems are equipped with a fan system for heat dissipation. The fan system usually has a control device and at least one fan, and the control device can adjust the rotation speed of the fan according to the actual working status of the electronic system. For example, when an external system has a commonly used CPU (Central Processing Unit), the produced heat energy is relatively high. If a fan system is used in this external system, it can adjust the rotation speed of the fan through the control device in order to meet the heat dissipating requirement. On the contrary, when the CPU is in an idle state, the rotation speed of the fan can decrease relatively such that the energy may be saved.

FIG. 1 is a block diagram showing a conventional control device 10 of a fan system, which is cooperated with an external system 1. Referring to FIG. 1, the control device 10 includes a rotation speed controlling unit 11 and a driving unit 12, which is typically a driving chip. The rotation speed controlling unit 11 has a power supply source coupled to an exterior voltage source V, and a signal input terminal for receiving a target rotation speed controlling signal 101 outputted by the external system 1 and producing a rotation speed controlling signal 102 according to the target rotation speed controlling signal 101. The driving unit 12 controls a rotation speed of a fan 13 according to the rotation speed controlling signal 102. In general, the voltage of the rotation speed controlling signal 102 is inversely proportional to the rotation speed of the fan 13. That is, as the voltage of the rotation speed controlling signal 102 decreases, the rotation speed of the fan 13 increases.

When the control device 10 is initially started, the target rotation speed controlling signal 101 may not reach the desired voltage level immediately since the external system 1 still performs the initialization operation. Thus, the control device 10 may output the rotation speed controlling signal 102 with a low voltage, which leads to the fastest rotation speed of the fan 13. In this situation, the starting current of the fan is excess. In addition, if the fan 13 has problems (e.g. it may be stuck by something) and the problems are then be removed, the control device 10 should be restarted. In this situation, the rotation speed controlling signal 102 can not be outputted immediately, too, so that the fan 13 operates at the fastest rotation speed. Therefore, the starting current of the fan is also excess. The above mentioned situations both lead to the energy waste and the increasing temperature of the fan.

Therefore, it is desirable to provide a fan system, a control device of a fan system and a control method of a fan system, which can use lower rotation speed to start or restart a fan so as to solve the above-mentioned problems.

SUMMARY OF THE INVENTION

In view of the foregoing, the invention is to provide a fan system, a control device of a fan system and a control method of a fan system, which can use lower rotation speed to start or restart a fan.

To achieve the above, a control device of a fan system of this invention, which receives a starting voltage, comprises a start controlling unit and a driving unit. The fan system comprises at least one fan. The start controlling unit receives the starting voltage and outputs a start controlling signal according to the starting voltage. The start controlling unit stops outputting the start controlling signal after a predetermined period. The driving unit is electrically connected with the start controlling unit and the fan, respectively, and receives the start controlling signal for controlling a rotation speed of the fan.

To achieve the above, the invention discloses a control method of a fan system, which comprises at least one fan. The control method comprises the following steps of: receiving a starting voltage; producing a start controlling signal for controlling a rotation speed of the fan according to the starting voltage; and stopping outputting the start controlling signal according to the starting voltage after a predetermined period so as to produce a rotation speed controlling signal for controlling the rotation speed of the fan.

To achieve the above, the invention discloses a fan system, which receives a starting voltage. The fan system comprises at least one fan and a control device. The control device comprises a start controlling unit and a driving unit. The start controlling unit receives the starting voltage and outputs a start controlling signal according to the starting voltage. The start controlling unit stops outputting the start controlling signal after a predetermined period. The driving unit is electrically connected with the start controlling unit and the fan, respectively, and receives the start controlling signal for controlling a rotation speed of the fan.

As mentioned above, the fan system, control device and control method of the invention use the start controlling unit to control the fan starting or restarting at lower rotation speed. Compared with the prior art, the invention can prevent the problem of excessive starting current, so that the fan can be avoided from being damaged and increasing temperature caused by fast rotation speed.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
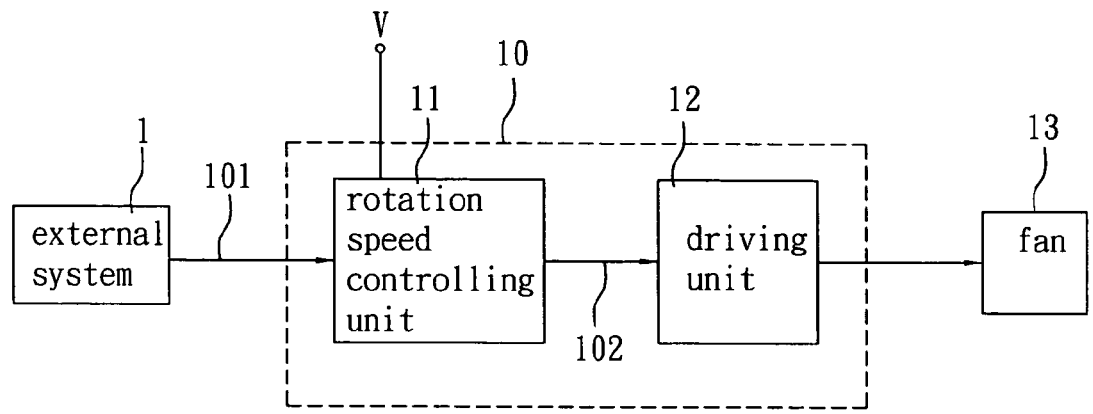
FIG. 1 is a block diagram showing a conventional control device of a fan system cooperated with an external system.
Figure 2:
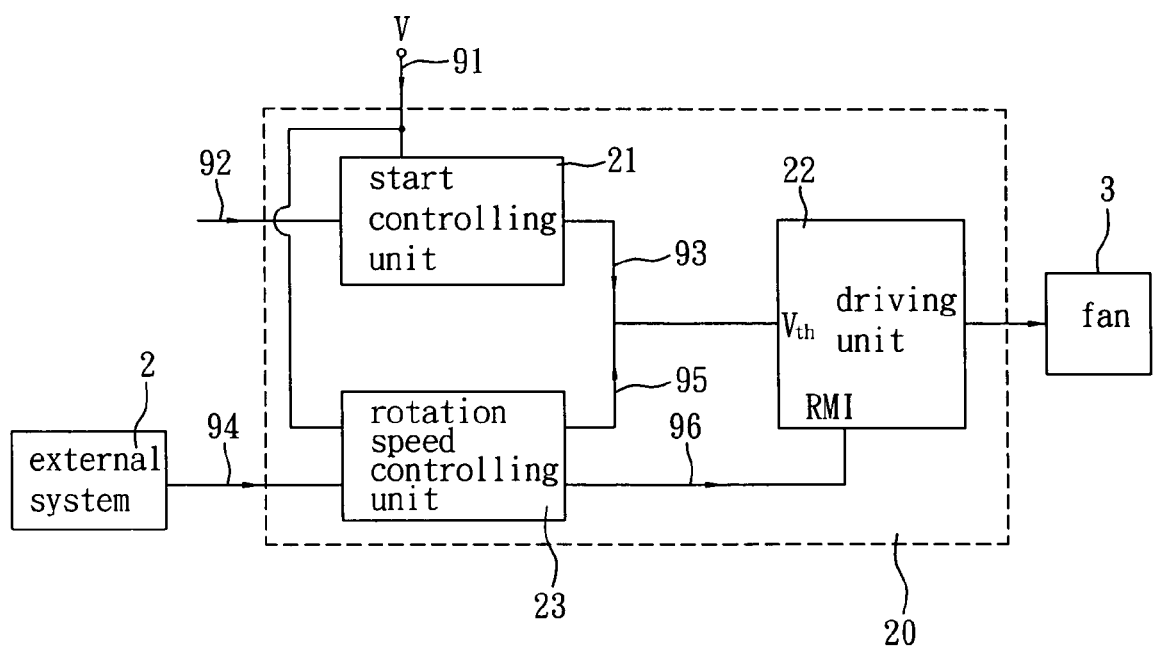
FIG. 2 is a block diagram showing a control device of a fan system according to a preferred embodiment of the invention.

FIG. 2 is a schematic view showing a control device 20 of a fan system, which is cooperated with an external system 2 having at least one fan 3, according to a preferred embodiment of the invention. The control device 20 receives a starting voltage 91, which is supplied by an exterior voltage source V, and then starts to work. Referring to FIG. 2, the control device 20 comprises a start controlling unit 21 and a driving unit 22.

When the external system 2 and the control device 20 start, the external system 2 has to perform an initialization operation. The control device 20 can control an initial rotation speed of the fan 3 such that the fan 3 rotates at a specific rotation speed. Then, after a predetermined period and the external system 2 has been initialized, a target rotation speed controlling signal 94, such as a pulse width modulation signal, will be outputted to the control device 20. The control device 20 controls the rotation speed of the fan 3 according to the target rotation speed controlling signal 94.

When the control device 20 receives the starting voltage 91, the start controlling unit 21 produces and outputs a start controlling signal 93. In the embodiment, the start controlling signal 93 can be a high voltage signal. After a predetermined period, the start controlling unit 21 stops outputting the start controlling signal 93.

The driving unit 22 is electrically connected with the start controlling unit 21 and the fan 3, respectively. The driving unit 22 receives the start controlling signal 93 for controlling a rotation speed of the fan 3. In the embodiment, the driving unit 22 has a signal input terminal $V_{th}$ electrically connected with the start controlling unit 21 and a half speed signal input terminal RMI. The signal input terminal $V_{th}$ receives the start controlling signal 93 and controls the rotation speed of the fan 3 according to the start controlling signal 93.

The control device 20 further comprises a rotation speed controlling unit 23, which is electrically connected with the driving unit 22. After the predetermined period, the external system 2 transmits the target rotation speed controlling signal 94 to the rotation speed controlling unit 23. The rotation speed controlling unit 23 produces a rotation speed controlling signal 95 and/or a half speed controlling signal 96, which are/is outputted to the driving unit 22, according to the starting voltage 91 and the target rotation speed controlling signal 94. The rotation speed controlling unit 23 transmits the rotation speed controlling signal 95 to the signal input terminal $V_{th}$ of the driving unit 22. In addition, the rotation speed controlling unit 23 transmits the half speed controlling signal 96 to the half speed signal input terminal RMI of the driving unit 22. Therefore, the driving unit 22 can control the rotation speed of the fan 3 to, the lowest rotation speed according to the half speed controlling signal 96.

In the present embodiment, the driving unit 22 can be a driving chip. In general, the voltages of the start controlling signal 93 and the rotation speed controlling signal 95 are inversely proportional to the rotation speed of the fan 3. That is, as the voltages of the start controlling signal 93 and the rotation speed controlling signal 95 decrease, the rotation speed of the fan 3 increases, which leads to larger starting current of the fan 3. On the contrary, when the voltages of the start controlling signal 93 and the rotation speed controlling signal 95 increase, the rotation speed of the fan 3 decreases, which leads to smaller starting current of the fan 3. Furthermore, according to the specification of the driving chip, if the signal input terminal $V_{th}$ receives a voltage greater than a lowest rotation speed voltage, the driving chip controls the fans to operate at the lowest rotation speed.

The external system 2 controls the rotation speed of the fan 3 through the control device 20 so as to dissipate heat. When the external system 2 and the control device 20 start, the external system 2 has to perform an initialization operation so that it is unable to output the target rotation speed controlling signal 94. At this moment, the start controlling unit 21 produces the start controlling signal 93 for controlling the rotation speed of the fan 3. Thus, the fan 3 can operate at the lower/lowest rotation speed so as to prevent the fan 3 from the excessive starting current. After a predetermined period, the start controlling unit 21 stops outputting the start controlling signal 93. At this moment, if the external system 2 has been initialized, the target rotation speed controlling signal 94 can be outputted to control the rotation speed of the fan 3.

The control device 20 can further receive a warning signal 92. When receiving the starting voltage 91 and the warning signal 92, the start controlling unit 21 outputs the start controlling signal 93 to the driving unit 22.

If the fan 3 operates abnormally (e.g. it may be stuck by something), the control device 20 receives the warning signal 92. In this situation, the start controlling unit 21 produces the start controlling signal 93 to control the fan 3 operating at lower rotation speed. In addition, when the abnormal situation is solved and the control device 20 is restarted, the control device 20 produces the start controlling signal 93. Thus, the starting current is not excessive, and the fan 3 can be prevented from being damaged.

Figure 3:
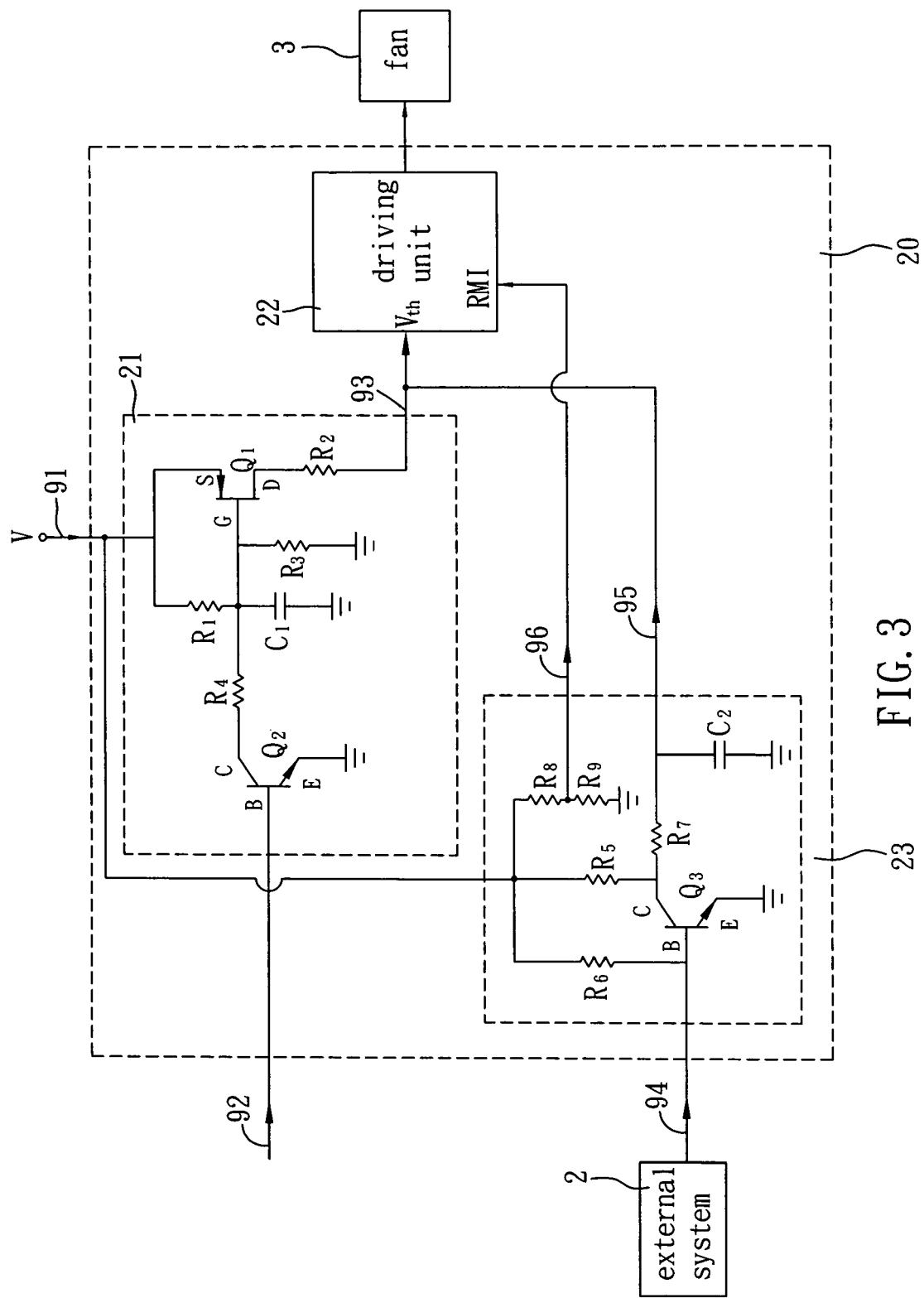
FIG. 3 is a circuit diagram showing an equivalent circuit of the control device according to the preferred embodiment of the invention.

FIG. 3 is a circuit diagram showing the control device of a fan system according to the preferred embodiment of the invention. Referring to FIG. 3, the start controlling unit 21 has a switching element $Q_1$, two resistors $R_1$ and $R_2$, and a capacitor $C_1$. The switching element $Q_1$ of this embodiment is a transistor or any electrical element having the switching function.

The switching element $Q_1$ has a source S, which is electrically connected to the voltage source V and receives the starting voltage 91. The resistor $R_1$ has a first terminal electrically connected to the source S of the switching element $Q_1$. The capacitor $C_1$ has a first terminal electrically connected to a second terminal of the resistor $R_1$ and a second terminal grounded.

The resistor $R_2$ has a first terminal electrically connected to a drain D of the switching element $Q_1$, and a second terminal electrically connected to the signal input terminal $V_{th}$ of the driving unit 22.

The start controlling unit 21 further comprises a switching element $Q_2$ and two resistors $R_3$ and $R_4$. The switching element $Q_2$ of this embodiment is a transistor or any electrical element having the switching function. The resistor $R_3$ has a first terminal electrically connected to the first terminal of the capacitor $C_1$, and a second terminal grounded. The switching element $Q_2$ has a base B for receiving the warning signal 92, a collector C electrically connected to a gate G of the switching element $Q_1$, and an emitter E grounded. The resistor $R_4$ has a first terminal electrically connected to the first terminal of the capacitor $C_1$, and a second terminal electrically connected to the collector C of the switching element $Q_2$. Accordingly, the collector C of the switching element Q2 and the gate G of the switching element $Q_1$ can electrically connect to each other through the resistor $R_4$.

The rotation speed controlling unit 23 comprises a switching element $Q_l$, several resistors $R_5$-$R_7$, and a capacitor $C_2$. The switching element $Q_3$ of this embodiment is a transistor or any electrical element having the switching function.

The resistor $R_5$ has a first terminal, which is electrically connected to the voltage source V and receives the starting voltage 91. The switching element $Q_3$ has a collector C electrically connected to a second terminal of the resistor $R_5$. The switching element $Q_3$ has a base B for receiving the target rotation speed controlling signal 94, and an emitter E grounded. The resistor $R_6$ has a first terminal electrically connected to the base B of the switching element $Q_3$, and a second terminal electrically connected to the first terminal of the resistor $R_5$.

The resistor $R_7$ has a first terminal, which is electrically connected to the collector C of the switching element $Q_3$. The capacitor $C_2$ has a first terminal electrically connected to a second terminal of the resistor $R_7$. The first terminal of the capacitor $C_2$ is further electrically connected to the driving unit 22 for outputting the rotation speed controlling signal 95.

The operations of the control device 20 will be described in the following. When the external system 2 and the control device 20 start, the external system 2 has to perform an initialization operation and thus can not output the target rotation speed controlling signal 94. If the control device 20 does not receive the warning signal 92, the switching element $Q_1$ will be turned ON due to the gate G and the source S of the switching element $Q_1$ receiving the starting voltage 91, and the switching elements $Q_2$ and $Q_3$ will be turned OFF. Thus, the start controlling signal 93 is outputted to the driving unit 22. In this condition, the voltage of the start controlling signal 93 approximates to the starting voltage 91. If the starting voltage 91 is greater than the lowest rotation speed voltage, the fan 3 can operate at the lowest rotation speed.

In addition, when the control device 20 starts, the capacitor $C_1$ starts to charge. After a predetermined period, the voltage difference between the capacitor $C_1$ and the voltage source V reaches a specific voltage difference, and then the switching element $Q_1$ is OFF for stopping outputting the start controlling signal 93. In this situation, the predetermined period may be the charging time of the capacitor $C_1$. The capacitance of the capacitor $C_1$ can be selected according to the user's requirement such that the predetermined period is determined.

At this moment, if the external system 2 has finished the initialization operation, the external system 2 can provide the target rotation speed controlling signal 94. At this time, the switching element $Q_3$ is ON and the switching elements $Q_1$ and $Q_2$ are OFF. Thus, the rotation speed controlling unit 23 produces the rotation speed controlling signal 95 according to the target rotation speed controlling signal 94 and outputs it to the driving unit 22 such that the driving unit 22 controls the rotation speed of the fan 3 according to the rotation speed controlling signal 95.

When the control device 20 uses its start controlling unit 21 to start the fan 3, the fan 3 is operated at the lowest rotation speed so as to avoid excessive starting current. In addition, the rotation speed controlling unit 23 further comprises two resistors $R_8$ and $R_9$. The resistor $R_8$ has a first terminal electrically connected to the first terminal of the resistor $R_5$, and a second terminal electrically connected to a first terminal of the resistor $R_9$. Thus, a voltage dividing circuit is formed to provide a half speed controlling signal 96 to a half speed signal input terminal RMI of the driving unit 22.

If the fan 3 operates abnormally, the control device 20 receives the warning signal 92. In this situation, the switching element $Q_2$ is ON so as to turn the switching element $Q_1$ ON, and then the start controlling signal 93 is outputted to the fan 3. Accordingly, the fan 3 is controlled to operate at the lowest rotation speed so as to avoid the excessive starting current of the fan 3. When the abnormal situation is solved, the warning signal 92 is stopped being outputted to the control device 20 and the control device 20 is restarted. At this time, the switching element $Q_1$ is ON and the switching elements $Q_2$ and $Q_3$ are OFF. Thus, the start controlling signal 93 is outputted to the driving unit 22 so that the fan 3 is operated at the lowest rotation speed to avoid excessive starting current. In addition, when the control device 20 and the exterior voltage source V are separated, the residual charges of the capacitor $C_1$ can be discharged through the resistor $R_3$. Accordingly, the capacitor $C_1$ can be reset for avoiding malfunctions in the next start procedure.

Figure 4:
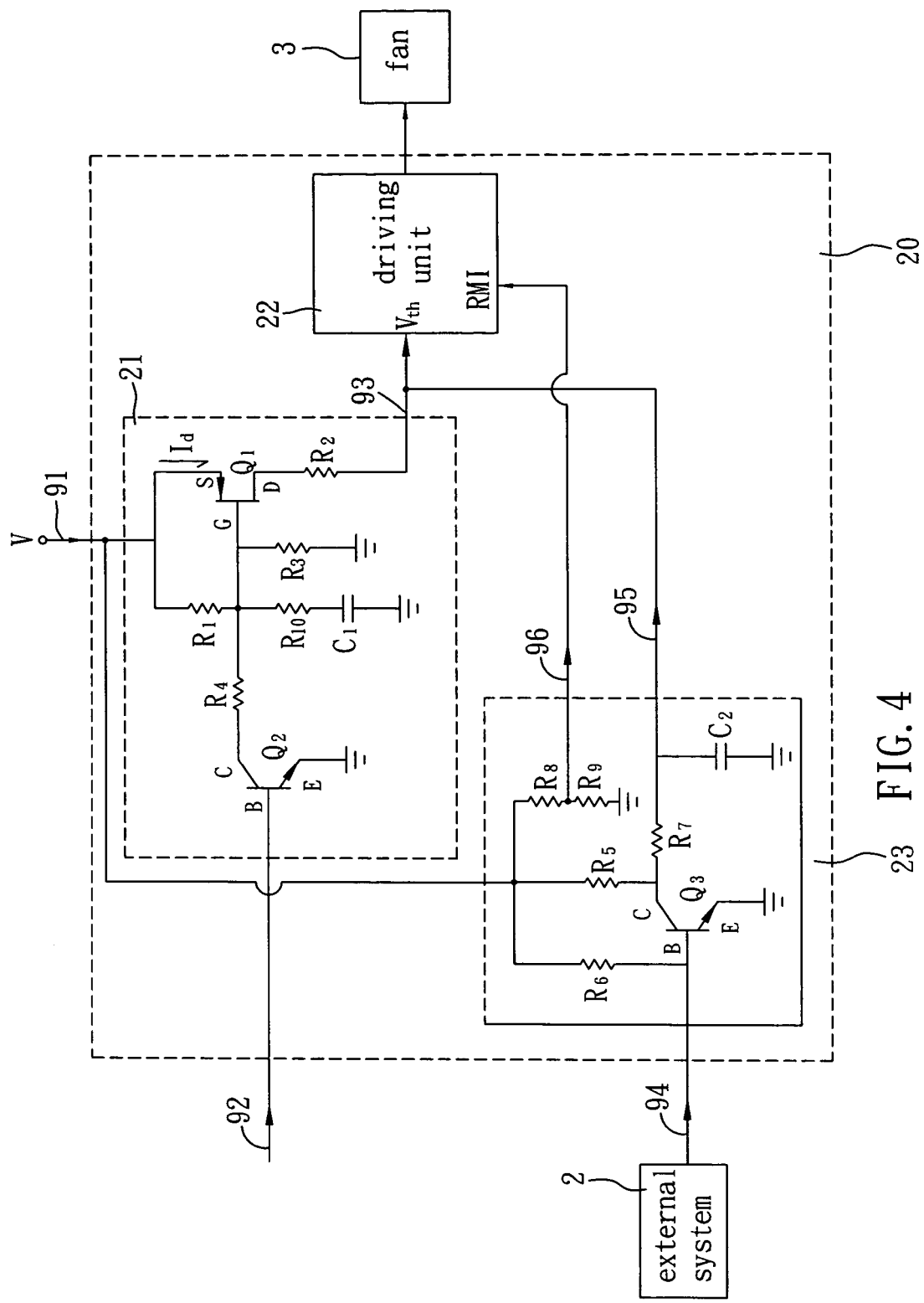
FIG. 4 is a circuit diagram showing another equivalent circuit of the control device according to the preferred embodiment of the invention.

FIG. 4 is a circuit diagram showing another equivalent circuit of the control device of a fan system according to the preferred embodiment of the invention.

The difference between the control device 20 of FIG. 3 and the control device 20 of FIG. 4 is that the start controlling unit 21 further has a resistor $R_{10}$, which has a first terminal electrically connected to the second terminal of the resistor $R_1$, and a second terminal electrically connected to the first terminal of the capacitor $C_1$.

When the control device 20 starts, the voltage difference $V_{gs}$ between the gate G and the source S of the switching element $Q_1$ is $$V \times \left( \frac{R_{10}}{R_1 + R_{10}} \right),$$

wherein V is the voltage source. In this embodiment, the ratio of the resistor $R_1$ to the resistor $R_8$ can be adjusted, such that $V_{gs}$ becomes a larger voltage difference such as −3V.

Figure 5:
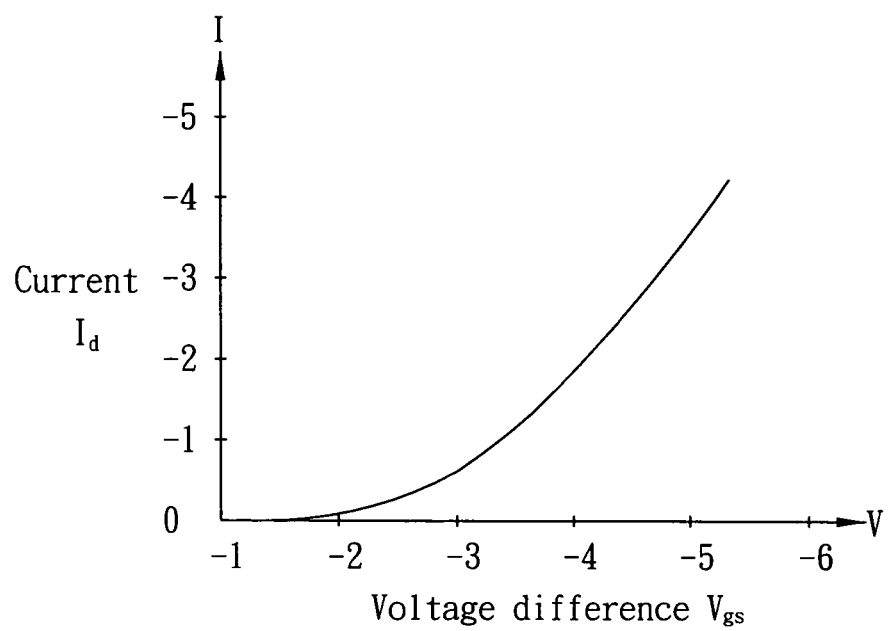
FIG. 5 is a graph showing a characteristic curve of a switching element of the control device according to the embodiment of the invention.
Figure 6:
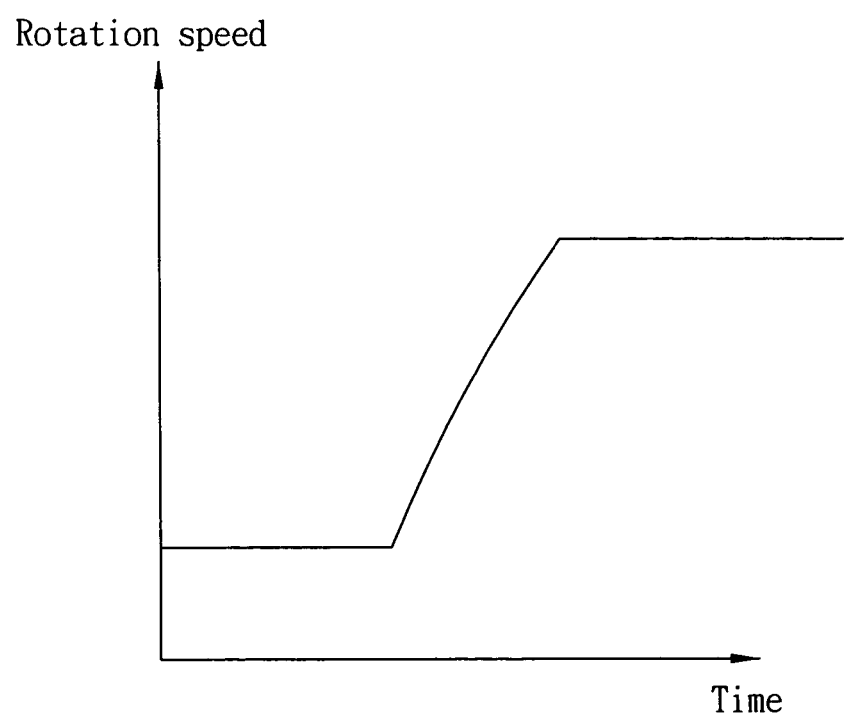
FIG. 6 is a graph showing a rotation speed of a fan of FIG. 4.

FIG. 5 is a graph showing a characteristic curve of the switching element $Q_1$. As shown in FIG. 5, when the capacitor $C_1$ charges, $V_{gs}$ rises slowly (e.g. from −6V to −1V) and a current $I_d$ flowing through the switching element $Q_1$ decreases (e.g. from −5I to 0I) at a lower speed (shown in FIG. 4). That is, the current flowing through the driving unit 22 can be controlled such that the voltage at the signal input terminal $V_{th}$ of the driving unit 22 decreases slowly. Thus, the driving unit 22 controls the rotation speed of the fan 3 to raise slowly according to the voltage of the signal input terminal $V_{th}$ such that the soft-start effect is obtained as shown in FIG. 6.

Figure 7:
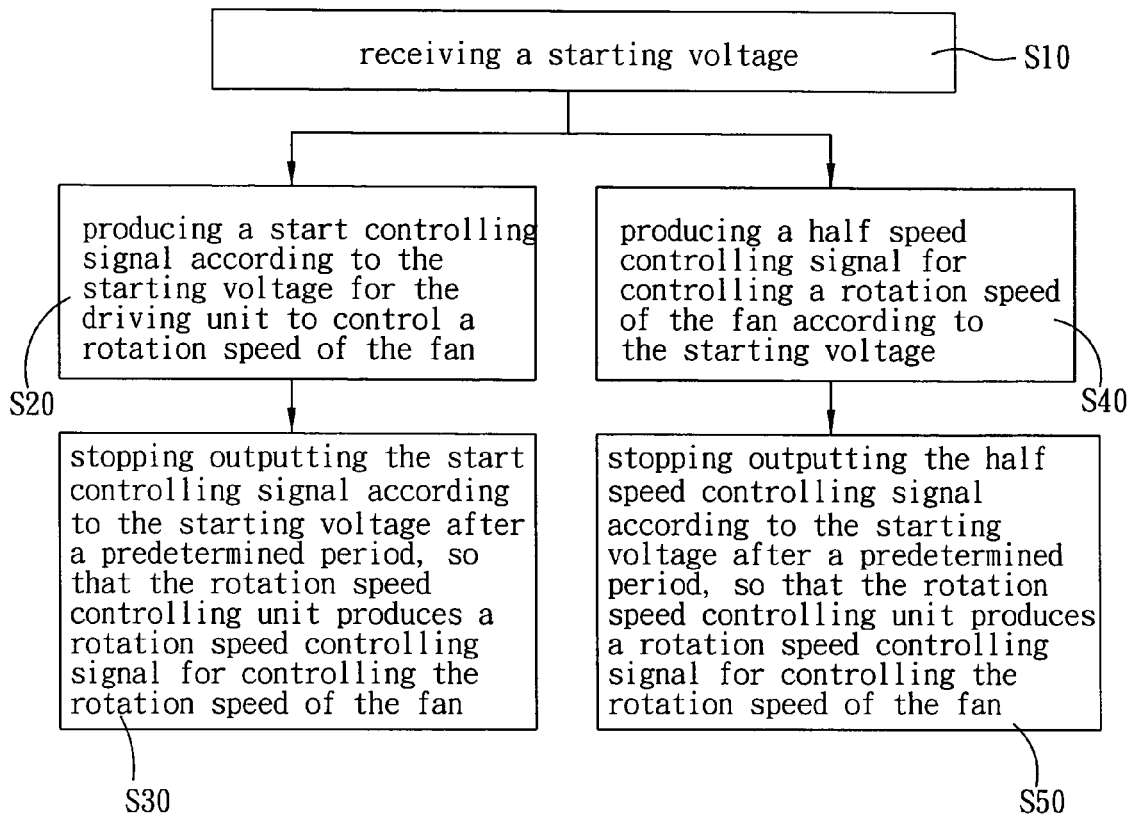
FIGS. 7 and 8 are flowcharts showing a control method of a fan system according to a preferred embodiment of the invention.

With reference to FIG. 7, a control method for controlling a fan system according to the embodiment of the invention is applied to the abovementioned control device 20. The fan system comprises at least one fan 3. The control method comprises the following steps of providing a first switch element $Q_1$ for receiving a starting voltage 91 (step S10), producing a start controlling signal 93 according to the starting voltage 91 for the driving unit 22 to control a rotation speed of the fan 3 (step S 20 ), and stopping outputting the start controlling signal 93 according to the starting voltage 91 after a predetermined period so that the rotation speed controlling unit 23 produces a rotation speed controlling signal 95 for controlling the rotation speed of the fan 3 (step S30). In the embedment, the step after stopping outputting the start controlling signal 93 further comprises providing a third switch element $Q_3$ for receiving a target rotation speed controlling signal 94 so as to produce the rotation speed controlling signal 95 for controlling the rotation speed of the fan.

Figure 8:
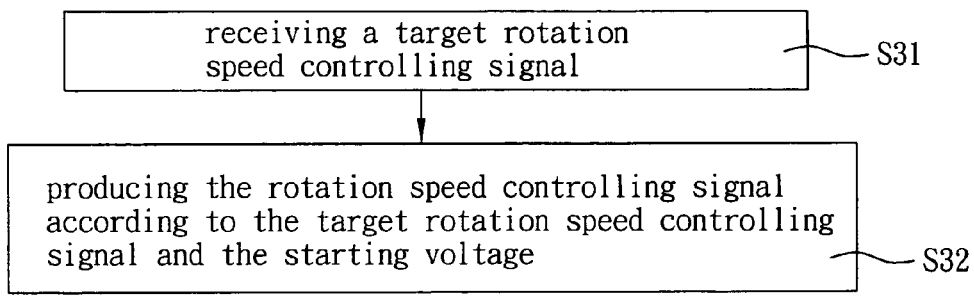

With reference to FIG. 8, the step S30 of producing the rotation speed controlling signal 95 comprises the following steps of receiving a target rotation speed controlling signal 94 (step S31), and producing the rotation speed controlling signal 95 according to the target rotation speed controlling signal 94 and the starting voltage 91 (step S32). In addition, the control method further comprises a step S40 for producing a half speed controlling signal 96 according to the starting voltage 91. Then, the control method further comprises a step S50 for stopping outputting the half speed controlling signal 96 according to the starting voltage 91 after a predetermined period so that the rotation speed controlling unit 23 produces a rotation speed controlling signal 95 for controlling the rotation speed of the fan 3.

The invention also discloses a fan system, which comprises at least one fan and a control device. The structures and functions of the fan and control device of the fan system are the same as those of the fan 3 and control device 20 of the above-mentioned embodiment, so the detailed descriptions are omitted for concise purpose.

In summary, the fan system, control device and control method of the invention use the start controlling unit to control the fan starting or restarting at lower rotation speed. Compared with the prior art, the invention can prevent the problem of excessive starting current so that the fan can be avoided from being damaged and increasing temperature caused by fast rotation speed.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control device of a fan system for receiving a starting voltage, wherein the fan system comprises a fan, the control device comprising:
    a start controlling unit comprising a first switching element which is used for receiving the starting voltage and outputting a start controlling signal according to the starting voltage, wherein the start controlling unit stops outputting the start controlling signal after a predetermined period; and
    a driving unit electrically connected with the start controlling unit and the fan, respectively, for receiving the start controlling signal and controlling a rotation speed of the fan according to the start controlling signal.

2. The control device according to claim 1, further comprising:
    a rotation speed controlling unit electrically connected with the driving unit for receiving the starting voltage and producing a rotation speed controlling signal according to the starting voltage, wherein the rotation speed controlling signal is outputted to the driving unit.

3. The control device according to claim 2, wherein the rotation speed controlling unit further produces a half speed controlling signal according to the starting voltage, wherein the half speed controlling signal is outputted to the driving unit.

4. The control device according to claim 2, wherein the rotation speed controlling unit produces the rotation speed controlling signal according to the starting voltage and a target rotation speed controlling signal.

5. The control device according to claim 4, wherein the target rotation speed controlling signal is a pulse width modulation signal provided by an external system.

6. The control device according to claim 2, wherein the rotation speed controlling unit comprises a third switching element and the rotation speed controlling unit outputs the rotation speed controlling signal when the third switching element is used for receiving a target rotation speed controlling signal and producing the rotation speed controlling signal according to the target rotation speed controlling signal.

7. The control device according to claim 1, wherein the control device further receives a warning signal, and the start controlling unit outputs the start controlling signal when receiving the starting voltage and the warning signal.

8. The control device according to claim 7, wherein the start controlling unit comprises a second switching element, the first switching element is set to ON and the second switching element is set to OFF when the start controlling unit receives the starting voltage, and the first switching element and the second switching element are set to ON when the start controlling unit receives the starting voltage and the warning signal.

9. The control device according to claim 7, wherein the start controlling unit comprises:
    a first resistor having a first terminal electrically connected to the first switching element;
    a first capacitor having a first terminal electrically connected to a second terminal of the first resistor and a second terminal grounded;
    a second resistor having a first terminal electrically connected to the first switching element and a second terminal electrically connected to the driving unit;
    a third resistor having a first terminal electrically connected to the first terminal of the first capacitor and a second terminal grounded; and
    a second switching element for receiving the warning signal and electrically connected with the first switching element.

10. The control device according to claim 9, wherein the second switching element has a base for receiving the warning signal, a collector electrically connected to a gate of the first switching element, and an emitter grounded.

11. The control device according to claim 9, wherein the predetermined period is determined according to a charging time of the first capacitor.

12. The control device according to claim 7, wherein the driving unit is a driving chip for providing the warning signal.

13. The control device according to claim 1, wherein the starting voltage is relatively greater than a minimum rotation speed voltage of the driving unit.

14. The control device according to claim 1, wherein when a voltage of the start controlling signal decreases, the driving unit increases the rotation speed of the fan, and when the voltage of the start controlling signal increases, the driving unit decreases the rotation speed of the fan.

15. The control device according to claim 1, wherein the start controlling unit comprises:
    a first resistor having a first terminal electrically connected to the first switching element;
    a first capacitor having a first terminal electrically connected to a second terminal of the first resistor and a second terminal grounded; and
    a second resistor having a first terminal electrically connected to the first switching element and a second terminal electrically connected to the driving unit.

16. The control device according to claim 15, wherein the start controlling unit further comprises a tenth resistor electrically connected to the first resistor and the first capacitor.

17. The control device according to claim 1, wherein the rotation speed controlling unit comprises:
   a fifth resistor having a first terminal for receiving the starting voltage;
   a third switching element electrically connected to a second terminal of the fifth resistor;
   a sixth resistor having a first terminal electrically connected to the third switching element;
   a seventh resistor having a first terminal electrically connected to the third switching element;
   a second capacitor having a first terminal electrically connected to a second terminal of the seventh resistor for outputting the rotation speed controlling signal and a second terminal grounded;
   an eighth resistor having a first terminal electrically connected to the first terminal of the fifth resistor; and
   a ninth resistor having a first terminal electrically connected to a second terminal of the eighth resistor for outputting the half speed controlling signal.

18. A control method for controlling a fan system, wherein the fan system comprises at least a fan, the method comprising steps of:
   providing a first switch element for receiving a starting voltage;
   producing a start controlling signal for controlling a rotation speed of the fan according to the starting voltage; and
   stopping outputting the start controlling signal according to the starting voltage after a predetermined period so as to produce a rotation speed controlling signal for controlling the rotation speed of the fan.

19. The method according to claim 18, wherein the step of producing the rotation speed controlling signal comprises steps of:
   receiving a target rotation speed controlling signal; and
   producing the rotation speed controlling signal according to the target rotation speed controlling signal and the starting voltage.

20. The method according to claim 18, further comprising steps of:
   producing a half speed controlling signal for controlling a rotation speed of the fan according to the starting voltage; and
   stopping outputting the half speed controlling signal according to the starting voltage after a predetermined period so as to produce a rotation speed controlling signal for controlling the rotation speed of the fan.

21. The method according to claim 18, wherein the step after stopping outputting the start controlling signal further comprises a step of: providing a third switch element for receiving a target rotation speed controlling signal so as to produce the rotation speed controlling signal for controlling the rotation speed of the fan.

22. A fan system, which receives a starting voltage, comprising:
   at least a fan; and
   a control device comprising a start controlling unit and a driving unit, wherein the start controlling unit comprises a first switching element which is used for receiving the starting voltage and outputs a start controlling signal according to the starting voltage, the start controlling unit stops outputting the start controlling signal after a predetermined period, and the driving unit is electrically connected with the start controlling unit and the fan, respectively, for receiving the start controlling signal and controlling a rotation speed of the fan according to the start controlling signal.

* * * * *